United States Patent
Marupaduga et al.

(10) Patent No.: US 10,660,095 B1
(45) Date of Patent: May 19, 2020

(54) METHOD AND SYSTEM FOR CONTROLLING IN-BAND CARRIER USE BASED ON CAPACITY-MODE OF SERVICE ON HOST CARRIER

(71) Applicant: Sprint Spectrum L.P., Overland Park, KS (US)

(72) Inventors: Sreekar Marupaduga, Overland Park, KS (US); Bryan T. Barbee, Olathe, KS (US); Andrew M. Wurtenberger, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 187 days.

(21) Appl. No.: 15/641,636

(22) Filed: Jul. 5, 2017

(51) Int. Cl.
*H04W 72/04* (2009.01)
*H04L 12/24* (2006.01)
*H04W 4/70* (2018.01)
*H04W 92/10* (2009.01)
*H04W 88/08* (2009.01)

(52) U.S. Cl.
CPC ..... *H04W 72/0453* (2013.01); *H04L 41/0813* (2013.01); *H04W 4/70* (2018.02); *H04W 72/0406* (2013.01); *H04W 88/08* (2013.01); *H04W 92/10* (2013.01)

(58) Field of Classification Search
None
See application file for complete search history.

(56) References Cited

U.S. PATENT DOCUMENTS

| | | | | |
|---|---|---|---|---|
| 2011/0158156 | A1* | 6/2011 | Ma | H04B 7/15542 370/315 |
| 2014/0045491 | A1* | 2/2014 | Van Phan | H04W 84/005 455/426.1 |
| 2015/0312783 | A1 | 10/2015 | Wakabayashi et al. | |
| 2016/0127170 | A1* | 5/2016 | Kim | H04L 5/0035 370/225 |
| 2016/0380719 | A1* | 12/2016 | Bassow | H04B 7/18506 455/1 |
| 2017/0094621 | A1* | 3/2017 | Xu | H04W 56/001 |
| 2017/0265187 | A1* | 9/2017 | Chen | H04B 7/15528 |
| 2017/0273078 | A1* | 9/2017 | Rico Alvarino | H04W 72/0446 |
| 2017/0373900 | A1* | 12/2017 | Adhikary | H04L 5/0048 |

(Continued)

OTHER PUBLICATIONS

Hyunho Yang, Kiseon Kim "A QoS Providing Multimedia Ad Hoc Wireless LAN with Granular OFDM-CDMA Channel" Feb. 17, 2003.*

(Continued)

*Primary Examiner* — Xavier S Wong

(57) ABSTRACT

A base station dynamically controls whether or not to serve a WCD on an in-band carrier defined within occupied bandwidth of a host carrier, with the dynamic controlling being based on whether the base station is operating in a capacity-mode on the host carrier, such as whether the base station has beamforming enabled on the host carrier and/or the base station is serving one or more relay nodes on the host carrier. If the base station is operating in a capacity-mode on the host carrier, then the base station could responsively transition a WCD from being served on the in-band carrier to instead being served on a guard-band carrier defined within a guard-band of the host carrier, or to being served on another carrier that is not an in-band carrier defined in the occupied bandwidth of the host carrier.

20 Claims, 5 Drawing Sheets

(56) References Cited

U.S. PATENT DOCUMENTS

2018/0316464 A1* 11/2018 Stern-Berkowitz ......................... H04L 1/0034
2019/0207697 A1*  7/2019 Ghasemzadeh ........ H04J 11/003
2019/0349734 A1* 11/2019 Sui ...................... H04W 68/005

OTHER PUBLICATIONS

H. Park, J. Yoon and B. Kwon "3GPP NB-IoT related Standardization Trends" p. 58-65, Jul. 8, 2016.*
Dino Flore, "3GPP Standards for the Internet-of-Things," GSMA MIoT, Feb. 2016.

* cited by examiner

US 10,660,095 B1

METHOD AND SYSTEM FOR CONTROLLING IN-BAND CARRIER USE BASED ON CAPACITY-MODE OF SERVICE ON HOST CARRIER

BACKGROUND

A typical wireless communication system includes a number of base stations each radiating to provide coverage in which to serve wireless client devices (WCDs) such as cell phones, tablet computers, tracking devices, embedded wireless modules, and other wirelessly equipped devices. In turn, each base station may sit as a node on a core access network that includes entities such as a network controller and a gateway system that provides connectivity with an external transport network such as the Internet. With this arrangement, a WCD within coverage of the system may engage in air interface communication with a base station and may thereby communicate via the base station with various remote network entities or with other WCDs served by the base station.

Such a system may operate in accordance with a particular air interface protocol, examples of which include, without limitation, Long Term Evolution (using Orthogonal Frequency Division Multiple Access (OFDMA) and Single Carrier Frequency Division Multiple Access (SC-FDMA)), Code Division Multiple Access (CDMA) (e.g., 1×RTT and 1×EV-DO), Global System for Mobile Communications (GSM), IEEE 802.11 (WIFI), BLUETOOTH, and others.

In accordance with the air interface protocol, a base station may provide service on one or more carriers, each spanning particular radio-frequency on which communications can flow wirelessly between the base station and WCDs. Such a carrier could be structured to provide a downlink for carrying communications from the base station to WCDs and an uplink for carrying communications from WCDs to the base station. For instance, the carrier could be frequency division duplex (FDD), with separate frequency ranges provided respectively for downlink and uplink communication, or time division duplex (TDD), with a single frequency range being time division multiplexed between downlink and uplink use.

Through modulation or other means on the carrier, in accordance with the air interface protocol, the downlink and uplink could then be structured to define various channels for carrying communications between the base station and WCDs. For instance, the downlink could be structured to define (i) a downlink shared channel with resources allocable by the base station for carrying data from the base station to WCDs and (ii) downlink control channels with resources for carrying control signaling from the base station to WCDs. And the uplink could be structured to define (i) an uplink shared channels with resources allocable by the base station for carrying data from WCDs to the base station and (ii) uplink control channels with resources for carrying control signaling from WCDs to the base station.

OVERVIEW

A representative air interface protocol may support carriers that have specific frequency bandwidths (as the frequency ranges of the downlink and uplink using FDD carrier, or as the shared downlink/uplink frequency range using TDD). For example, LTE supports carriers that have bandwidths of 1.4 MHz, 3 MHz, 5 MHz, 10 MHz, 15 MHz, and 20 MHz (and may support wider bandwidths at higher frequencies. Thus, LTE base stations could be configured to provide service on one or more carriers each having one those supported LTE bandwidths. To facilitate this, a wireless service provider could acquire a license for radio frequency spectrum and could configure base stations to provide service on carriers of such bandwidths within the licensed spectrum.

For various reasons, however, a wireless service provider may face a scenario where one of its base stations is or will be configured to provide service on a carrier of particular bandwidth and where the service provider would like to have the base station also provide service on another carrier of a narrower bandwidth, but without the need to license or otherwise add more spectrum for that other carrier.

This scenario could arise, by way of example, when the base station will serve Machine Type Communication (MTC) devices (e.g., Internet of Things (IoT) devices). Example MTC devices may operate with relatively low power and may engage in small quantities of data communication from time to time, to facilitate MTC functions such as reporting, tracking, controlling, metering, updating, and the like. It could therefore be beneficial for MTC devices to operate on relatively narrow-bandwidth (narrow-band) carriers, where air interface communication could consume less power than on a wider carrier, and where the narrow bandwidth could suffice to support carrying small quantities of data communication per unit time.

One way to provide such a narrow-band carrier without licensing additional spectrum is to configure the narrow-band carrier within the allotted bandwidth of a wider-band (wide-band) carrier. For instance, if a base station is configured to provide service on a standard LTE carrier such as one of those noted above, the base station could also be configured to provide service on a narrow-band carrier defined within the LTE carrier's bandwidth. In this arrangement, the wide-band carrier could be considered a host carrier, and the narrow band carrier could be considered a guest carrier.

In practice, a small portion of the frequency bandwidth at each end of a typical carrier could be reserved as a guard band to help minimize interference between adjacent carriers, with the bulk of the bandwidth between those guard bands defining an "occupied" or useable portion of the carrier. For instance, Table 1 below lists the typical occupied bandwidths and guard bands of the LTE carriers noted above.

TABLE 1

| Carrier Bandwidth | Occupied Bandwidth | Guard Band at each end |
|---|---|---|
| 1.4 MHz | 1.08 MHz | 160 kHz |
| 3 MHz | 2.7 MHz | 150 kHz |
| 5 MHz | 4.5 MHz | 250 kHz |
| 10 MHz | 9 MHz | 500 kHz |
| 15 MHz | 13.5 MHz | 750 kHz |
| 20 MHz | 18 MHz | 1000 kHz |

With such an arrangement, a narrow-band carrier could be configured as a guest carrier within the occupied bandwidth of a host carrier, in which case the narrow-band carrier would be considered an "in-band carrier" within the host carrier. For instance, a 1.08 MHz narrow-band carrier could be configured as an in-band carrier within the 4.5 MHz occupied bandwidth of a 5 MHz LTE carrier or within the 9 MHz occupied bandwidth of a 10 MHz LTE carrier. As the in-band carrier is configured within the occupied bandwidth of the host carrier, a portion of the host carrier's air interface resources would thus also be air interface resources of the guest carrier, but the base station could prioritize use of those air interface resources for the host carrier when needed or could otherwise manage the resources to facilitate providing service discretely on the host carrier and on the in-band guest carrier.

Alternatively, a narrow-band carrier could be configured as a guest carrier within the guard band of a host carrier, in which case the narrow-band carrier would be considered a "guard-band carrier" rather than an in-band carrier. For instance, a 320 KHz narrow-band carrier could be configured as a guard-band carrier within one of the 500 kHz guard bands of a 10 MHz LTE carrier or within one of the 750 kHz guard bands of a 15 MHz carrier. Advantageously, the guard-band carrier would thus not overlap with the occupied bandwidth of the host carrier, although a downside could exist by defining the guard-band carrier at a frequency position that would otherwise be reserved to help minimize inter-carrier interference.

When a WCD is served by a base station on an in-band carrier defined as a guest carrier in the occupied bandwidth of host carrier, certain circumstances could justify transitioning the WCD to be served by the base station instead on a guard-band carrier defined within a guard band of the host carrier, or perhaps transitioning the WCD to be served on another carrier that is not at all within the bandwidth of the host carrier. In particular, this transition could be helpful if the base station is operating in what might be referred to as a "capacity-mode" on the host carrier, where the host carrier (namely its occupied bandwidth) is particularly susceptible to high usage.

Two examples of capacity-mode on the host carrier are (i) the base station being configured to provide beamforming service on the host carrier and (ii) the base station operating as a donor base station by serving a relay node on the host carrier. As to beamforming, the base station could have beamforming service selectively enabled on a carrier such as the host carrier. When beamforming service is enabled, the base station could use beamforming for transmission to WCDs in poor coverage, such as at the cell edge, which could effectively extend the range of the base station's coverage and consequently result in more communication traffic being served by the base station per unit time. As to donor base station service, the base station could be serving a relay node (e.g., a WCD module associated with a relay node), with the relay node being configured to itself serve other WCDs, which could also thereby result in more communication traffic being served by the base station per unit time.

In accordance with the present disclosure, a base station will dynamically control whether or not to serve a WCD on an in-band carrier defined within the occupied bandwidth of a host carrier, with the dynamic controlling being based on whether the base station is operating in a capacity-mode on the host carrier. For instance, when a WCD connects with a base station on the in-band carrier, the base station could determine whether the base station is operating in a capacity-mode on the host carrier. If the determination is that the base station is operating in a capacity-mode on the host carrier, then the base station could then transition the WCD from being served on the in-band carrier to instead being served on a guard-band carrier defined within a guard-band of the host carrier, or to being served on another carrier that is not an in-band carrier defined in the occupied bandwidth of the host carrier. Whereas, if the determination is that the base station is not operating in a capacity-mode on the host carrier, then the base station could proceed to serve the WCD on the in-band carrier.

In one respect, for instance, disclosed is a method operable in a wireless communication to control which carrier a base station serves a WCD on, where the base station provides service (i) on a host carrier, (ii) on an in-band carrier defined within occupied bandwidth of the host carrier, and (iii) on a guard-band carrier defined within a guard band of the host carrier. According to the method, the base station makes a determination of whether the base station is operating in a capacity-mode on the host carrier, such as (i) having beamforming enabled on the host carrier and/or (ii) serving at least one relay node on the host carrier. And based at least in part on that determination, the base station controls whether to serve the WCD on the in-band carrier or rather on the guard-band carrier. In particular, if the determination is that the base station is not operating in the capacity-mode on the host carrier, then the base station serves WCD on the in-band carrier rather than the guard-band carrier, whereas if the determination is that the base station is operating in the capacity-mode on the host carrier, then the base station serves the WCD on the guard-band carrier rather than the in-band carrier.

In another respect, disclosed is a base station configured to carry out such features. In particular, the base station includes a wireless communication interface having at least one radio, at least one power amplifier, and at least one antenna structure, cooperatively configured to provide service (i) on a host carrier, (ii) on an in-band carrier defined within occupied bandwidth of the host carrier, and (iii) on a guard-band carrier defined within a guard band of the host carrier. And the base station includes a controller configured to control whether the base station serves a WCD on the in-band carrier or rather on the guard-band carrier, by carrying out a method including (a) making a determination of whether the base station is operating in a capacity-mode on the host carrier, (b) if the determination is that the base station is not operating in the capacity-mode on the host carrier, then causing the base station to serve the WCD on the in-band carrier rather than the guard-band carrier, and (c) if the determination is that the base station is operating in the capacity-mode on the host carrier, then causing the base station to serve the WCD on the guard-band carrier rather than the in-band carrier.

And in yet another respect, disclosed is a method operable in a wireless communication system in which a base station provides service on a host carrier having a host-carrier occupied frequency bandwidth and provides service on a guest carrier having a guest-carrier frequency bandwidth defined within and narrower than the host-carrier occupied frequency bandwidth. The method involves the base station connecting with and serving a WCD on the guest carrier. Further, the method involves determine that the base station is operating in a particular mode on the host carrier, such as that the base station has beamforming enabled on the host carrier and/or is serving at least one relay node on the host carrier. And the method then involves, based at least on the base station operating in the particular mode on the host carrier, offloading the WCD from being served by the base station on the guest carrier (i) to being served by the base station on a carrier external to the host-carrier occupied frequency bandwidth or (ii) to being served by another base station.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
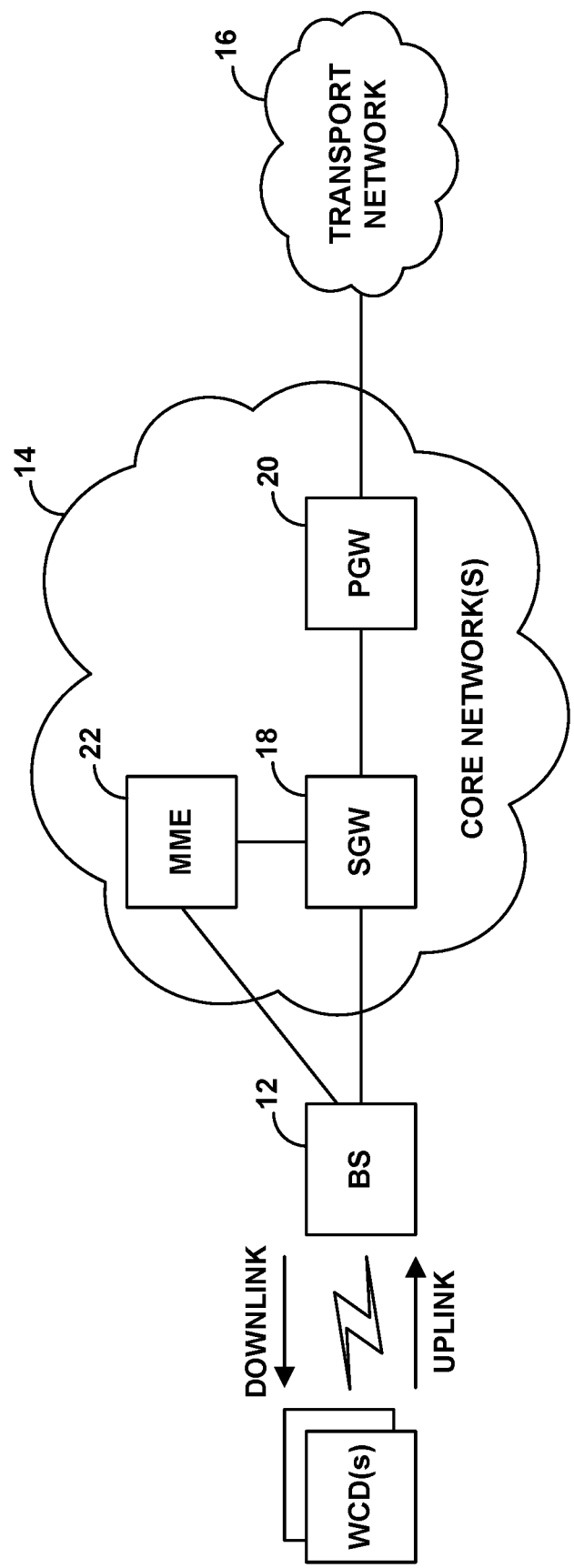
FIG. 1 is a simplified block diagram of an example LTE network.

The present method and system will be described herein in the context of LTE. However, it will be understood that principles of the disclosure can extend to apply in other scenarios as well, such as with respect to other air interface protocols. Further, even within the context of LTE, numerous variations from the details disclosed may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Referring to the drawings, as noted above, FIG. 1 is a simplified block diagram of an example LTE network. This network functions primarily to serve WCDs with wireless packet data communication service, including possibly voice-over-packet service, but may also provide other functions. As shown, the LTE network includes a representative LTE base station (evolved Node-B (eNodeB)) 12, which would have an antenna structure and associated equipment (e.g., baseband unit, radio, and power amplifier) for providing LTE coverage in which to serve WCDs. This base station could take any of a variety of forms, such as a macro base station, a small cell base station, and/or a relay base station, among other possibilities. Likewise, the WCDs could take various forms, such as any of those noted above for instance.

The base station has a communication interface with one or more core networks 14 each operated by a service provider or operator, each defining a public land mobile network (PLMN), and each providing connectivity with a transport network 16 such as the Internet. In an example arrangement, for instance, the base station could provide connectivity with a single operator's core network for a single PLMN and could be configured to serve WCDs that subscribe to service of that PLMN. And in another example arrangement, the base station could provide connectivity with two or more operators' core networks for separate, respective PLMNs and could be configured to serve WCDs that subscribe to service of any of those PLMNs. FIG. 1 depicts example components of an example core network. In particular, the example core network could include a serving gateway (SGW) 18, a packet-data-network gateway (PGW) 20, and a mobility management entity (MME) 22.

As noted above, a representative base station could provide service on one or more carriers, including for instance a host carrier, an in-band carrier, and a guard-band carrier, among possibly others. Each such carrier could define a downlink and an uplink and could be FDD or TDD. For instance, the base station could provide service on an FDD carrier that defines separate downlink and uplink frequency ranges and/or on a TDD carrier that defines a frequency range time division multiplexed between downlink and uplink use.

Figure 2:
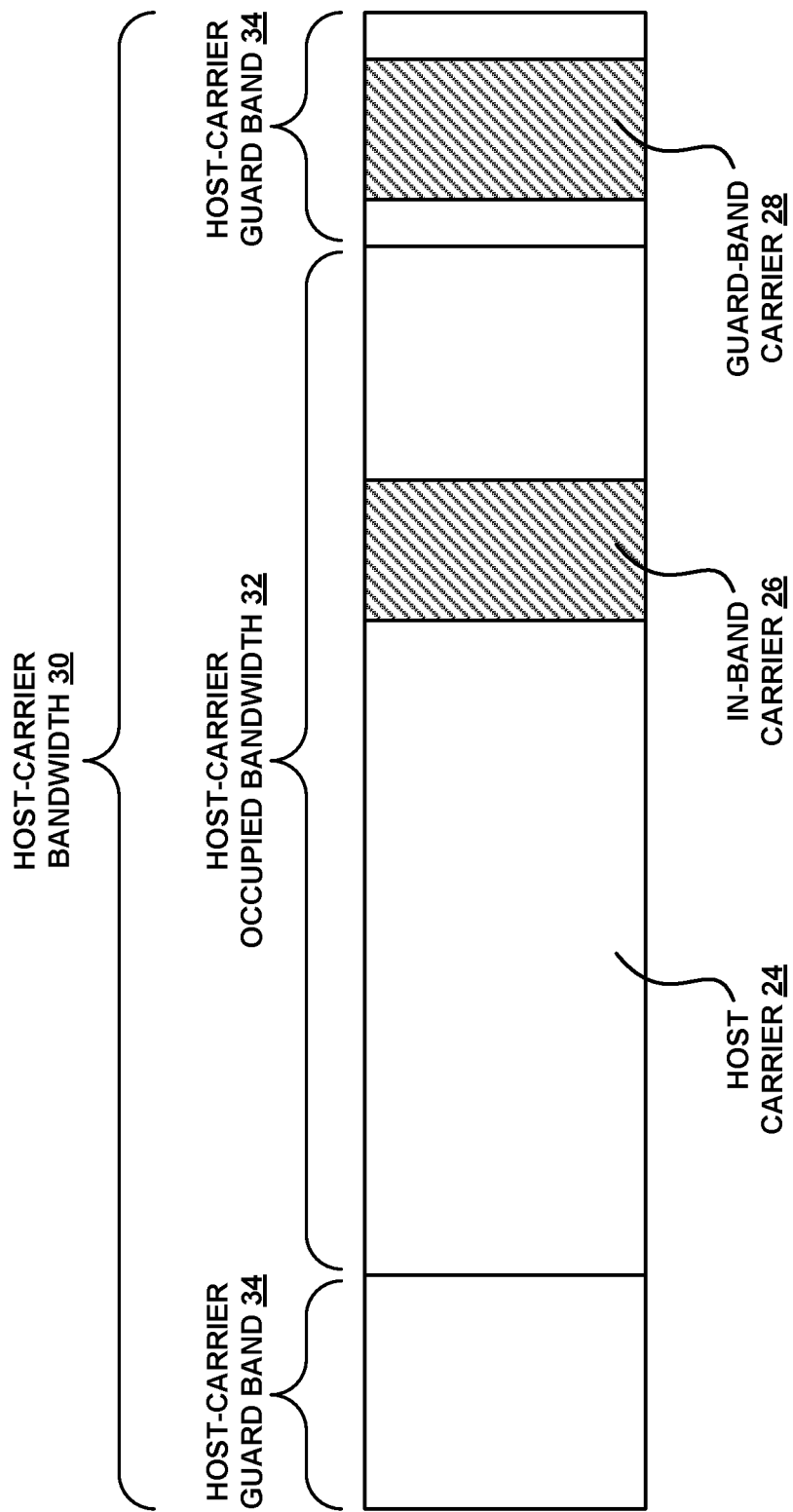
FIG. 2 is an illustration of host carrier encompassing an in-band carrier and a guard-band carrier.

FIG. 2 depicts these carriers by way of example as host carrier 24, in-band carrier 26, and guard-band carrier 28, each of which could be characterized by its center frequency and its bandwidth, and/or by one or more other attributes.

As shown, the host carrier 24 has a host-carrier bandwidth 30, which could be one of the standard LTE bandwidths noted above (among other possibilities), with the central bulk of the host-carrier bandwidth defining occupied bandwidth 32 of the host carrier and with high and low frequency end portions of the host-carrier bandwidth defining guard bands 34 of the host carrier. In line with the discussion above, the occupied bandwidth 32 is the portion of the host-carrier bandwidth 30 that is used in practice for air interface communication on the host carrier, and the guard bands 34 are portions of the host-carrier bandwidth 30 that are generally not used for air interface communication on the host carrier but are rather generally reserved to help minimize interference between the host carrier and any adjacent carriers.

The in-band carrier 26 is then defined within the occupied bandwidth 32 of the host carrier. In particular, the in-band carrier 26 could be a narrow-band carrier configured fully within the occupied bandwidth 32 of the host carrier, with the air interface resources that define the in-band carrier being a portion of the air interface resources of the host carrier's occupied bandwidth.

Whereas, the guard-band carrier 28 is defined within one of the guard bands 34 of the host carrier. In particular, the guard-band carrier 28 could be a narrow-band carrier configured fully within one of the host carrier's guard bands 34, with the air interface resources that define the guard-band carrier being air interface resources that would otherwise have been reserved to define at least part of the guard band.

In accordance with the LTE protocol, the air interface on the host carrier 24 is subdivided in the time domain and the frequency domain to define an array of resource elements for carrying modulated communications between the base station and WCDs served on the host carrier. In particular, in the time domain, the air interface defines a continuum of 10-millisecond (ms) frames, each of which is divided into ten 1-ms subframes, and each subframe is then further divided into two 0.5-ms timeslots and fourteen 66.67-microsecond (µs) symbol time segments (or twelve symbol time segments if an extended cyclic prefix is used). And in the frequency domain, the carrier bandwidth is divided into 15-kHz subcarriers (as many as would fit within the carrier bandwidth). With this arrangement, the air interface on the carrier thus defines an array of resource elements each occupying a 15 kHz subcarrier and spanning a 66.67 µs symbol time segment, and the base station and WCDs can communicate with each other through modulation of data in these resource elements.

Further, LTE defines particular groupings of resource elements as physical resource blocks (PRBs). In the time domain, each PRB has a duration corresponding to one timeslot (i.e., 7 symbol time segments, over 0.5 ms). And in the frequency domain, each PRB spans 12 subcarriers (i.e., 180 kHz). Thus, across the host carrier's bandwidth 30 in each subframe, the LTE air interface is divided into 12-sub-carrier groups, and for every 12-subcarriers, there are two PRBs, one in each timeslot of the subframe. Depending on the host carrier's bandwidth, the LTE air interface thus supports a certain number of such PRBs across the carrier in each timeslot. For instance, a 5 MHz carrier supports 25 PRBs across its bandwidth, a 10 MHz carrier supports 50 PRBs across its bandwidth, and a 20 MHz carrier supports 100 PRBs across its bandwidth.

In addition, LTE designates certain resource elements within the host carrier's occupied bandwidth to be used for particular control channel or shared channel communications on the host carrier.

On the downlink, for instance, the first one, two or three symbol time segments per subframe (or per downlink subframe in TDD) across the host carrier's occupied bandwidth generally define a downlink control region for carrying control signaling from the base station to WCDs, with certain control channels being defined in this region. The remaining symbol time segments per subframe across the occupied bandwidth then generally define a shared channel region or physical downlink shared channel (PDSCH) for carrying scheduled data communications from the base station to WCDs served on the host carrier. Further, LTE reserves certain resource elements on the downlink for other purposes, such to carry a cell-specific reference signal, a positioning reference signal, synchronization signals, and broadcast signals (e.g., system parameter messages), among others.

And on the uplink, certain PRBs at the low end and high end of the host carrier's occupied bandwidth (e.g., the first two and last two, frequency wide) generally define an uplink control region, primarily as a physical uplink control channel (PUCCH), for carrying control signaling from WCDs to the base station. And the PRBs in between the low and high end PUCCH resource blocks generally define an uplink shared channel region, as a physical uplink shared channel (PUSCH), for carrying scheduled data communications from WCDs to the base station. Further, as with the downlink, LTE reserves certain resource elements on the uplink for other purposes, such as to carry random access signals and WCD-specific reference signals (sounding reference signals) for instance.

In practice, the base station could advertise the presence of the host carrier by broadcasting a synchronization signal in the center six resource blocks in certain subframes of each frame. WCDs that are configured for possible operation on the host carrier could then scan for and detect that synchronization signal centered on the host carrier's center frequency, as an indication of the coverage on the host carrier. And upon detecting the synchronization signal, With this arrangement of the host carrier, the base station could then configure the in-band carrier 26 and the guard-band carrier 28 as narrow-band carriers each occupying certain respective portions of the host carrier's bandwidth. The base station could configure the in-band carrier 26 at a frequency position within the host carrier's occupied bandwidth such that the in-band carrier 26 would not interfere with key channels of the host carrier such as the host carrier's synchronization channels and broadcast channels for instance. And the base station could configure the guard-band carrier 28 at any position within a guard band of the host carrier.

Each of these narrow-band carriers could span anywhere from one to six PRBs of the host carrier to the extent space permits, among other possibilities. Further, the resource blocks within the narrow-band carriers could be aligned with resource blocks of the host carrier. And each of the narrow-band carriers could be configured to include channels such as those noted above in the host carrier, although the channels could be differently configured (e.g., with different configurations of resource elements) in the narrow-band carriers in a manner that would be understood by WCDs configured for operation on the narrow-band carriers (e.g., MTC devices or the like).

The base station could also advertise the presence of either or each narrow-band carrier by similarly broadcasting a synchronization signal at the center of the narrow-band carrier, so that WCDs configured for possible operation on the narrow-band carrier could scan for and detect that presence of coverage on the carrier. Or perhaps the base station could so advertise the presence of the in-band carrier but could forgo advertising the presence of the guard-band carrier, instead just redirecting WCDs to the guard-band carrier on an as-needed basis.

In operation, once a WCD has entered into base station coverage on any such carrier and has established frame timing and determined that coverage strength is sufficient, the WCD could engage in signaling to connect with the base station on that carrier. Further, the network could establish for the WCD one or more bearer connections between the WCD and the PGW, for carrying data communications to and from the WCD, and the base station could establish and maintain a context record for the WCD's connection, including an indication of the carrier on which the base station is serving the WCD, profile information regarding the WCD, and other information.

Once the WCD is so connected with the base station on a carrier, the base station could then serve the WCD in a connected mode. Namely, as data arrives for the WCD, the base station could schedule the transmission on one or more PRBs of the carrier's downlink shared channel and could accordingly engage in the transmission to the WCD. And as the WCD has data to transmit, the base station could schedule the transmission on one or more PRBs of the carrier's uplink shared channel, and the WCD could accordingly engage in the transmission.

In practice, the base station could provide service concurrently on each of these carriers. In particular, the base station could be connected with one or more WCDs on the host carrier 24 and could accordingly schedule use of host-carrier resources to carry communications to and from those WCDs, the base station could at the same time be connected with one or more WCDs on the in-band carrier 26 and could accordingly schedule use of in-band-carrier resources to carry communications to and from those WCDs, and the base station could at the same time be connected with one or more WCDs on the guard-band carrier 28 and could accordingly schedule use of guard-band-carrier resources to carry communications to and from those WCDs.

To the extent the in-band carrier shares air interface resources (e.g., shared-channel resources) with the host carrier's occupied bandwidth, the base station could further be configured to manage use of those resources as between the host carrier and the in-band carrier, to help avoid conflicts. In a representative implementation, for instance, the base station could prioritize use of those resources for host-carrier communications over use of those resources for in-band-carrier communications. In that case, however, if the host carrier is heavily loaded with communication traffic, there could be significant delays or other problems with scheduling and engaging in communications on in the in-band carrier, which could pose issues for the WCDs served on the in-band carrier.

On the other hand, the guard-band carrier would likely not suffer from these issues, as the guard-band carrier would not share air interface resources of the host carrier's occupied bandwidth. Consequently, even if the host carrier is heavily loaded with communication traffic, it could still be possible to schedule communications to and from WCDs in a timely manner on the guard-band carrier.

As noted above, the base station in this arrangement could operate on the host carrier in a capacity-mode that could give rise to an increased level of communication traffic on the host carrier. Two examples of such a mode, as discussed above, are (i) having beamforming enabled on the host carrier and (ii) serving a relay node on the host carrier.

As to beamforming, the base station could have a configuration setting, such as a flag in a base station configuration file that is provisioned automatically or by engineering input, indicating whether or not the base station has beamforming enabled on the host carrier. If the base station has beamforming enabled on the host carrier, then the base station could be configured to apply beamforming for transmissions to host-carrier-served WCDs that are in poor coverage or the like, such as by varying phase, amplitude and/or other attributes in a multi-antenna configuration to help direct transmissions at the WCDs. Whereas, if the base station does not have beamforming enabled on the host carrier, then the base station would not be configured to apply beamforming even when faced with WCDs in poor coverage or the like. As noted above, application of beamforming on the host carrier could effectively extend the base station's range of coverage on the host carrier, which could result in increased communication traffic on the host carrier.

As to serving a relay node, the base station could operate as a donor base station serving a relay node on the host carrier. In a representative arrangement, for instance, the relay node could include a relay base station and an associated relay-WCD module, and the relay-WCD could connect with and be served by the base station on the host carrier so as to provide a wireless relay backhaul connection for the relay base station. In turn, the relay base station could then itself serve end-user WCDs or other devices. This arrangement could likewise result in increased communication traffic on the host carrier, since the host carrier would additionally carry communication traffic flowing to or from the WCDs served by the relay node.

If the base station is operating in such a capacity-mode on the host carrier 24, then it could be helpful for the base station to offload one or more WCDs from being served by the base station on the in-band carrier 26 to being served instead on a carrier that is not defined within the occupied bandwidth of the host carrier. For instance, it could be helpful in that scenario to transition one or more such WCDs from being served by the base station on the in-band carrier (i) to being served by the base station instead on the guard-band carrier, (ii) to being served by the base station on another carrier outside of the host-carrier's occupied bandwidth, or (iii) to being served by another base station altogether.

Especially in a scenario where the base station is configured to prioritize use of shared air interface resources for the host-carrier over use of the shared air interface resources for the in-band carrier, this offloading might help improve communication service for the one or more WCDs at issue. Without the offloading, such a WCD could suffer from delayed or otherwise deteriorated communication on the in-band carrier, because the resources that the in-band carrier has in common with the host carrier could be consumed for use to carry host-carrier communications. In that situation, by offloading the WCD to a carrier that is not within the occupied bandwidth of the host carrier, such as to the guard-band carrier or other carrier or base station, the WCD could experience improved communications.

In a representative implementation, this process could apply in a scenario where a WCD has connected with the base station on the in-band carrier 26 and thus where the base station is serving the WCD on the in-band carrier. Upon the WCD so connecting, or in response to another trigger, the base station could then determine whether the base station is operating in a capacity-mode on the host carrier. And in response to determining that the base station is operating in a capacity-mode on the host carrier, the base station could then offload that WCD from the in-band carrier.

The base station could determine in various ways whether it is operating in capacity-mode on the host carrier. For example, if the capacity-mode comprises having beamforming enabled, the base station could determine by evaluating its configuration settings whether the base station currently has beamforming enabled on the host carrier. And as another example, if the capacity-mode comprises operating as a donor base station serving at least one relay node, the base station could determine by evaluating its context records for served WCDs, or through query or reference to other data sources, whether any of its served WCDs is a relay-WCD that provides connectivity for a relay base station.

Further, the offloading process could take various forms, depending on the carrier to which the WCD would be offloaded, and perhaps other factors. For example, if the base station will transition from serving the WCD on the in-band carrier 26 to instead serving the WCD on the guard-band carrier 28, the base station could transmit an RRC connection-reconfiguration message to the WCD, directing the WCD to tune to the guard-band carrier and to proceed with service on the guard-band carrier, and the base station could accordingly update its context record for the WCD and proceed to serve the WCD on the guard-band carrier. And as another example, if the base station will transition from serving the WCD on the in-band carrier 26 to instead serving the WCD on another carrier on which the base station provides service (not within the occupied bandwidth of the host carrier), then the base station could similarly transmit to the WCD an RRC connection-reconfiguration message redirecting the WCD to that other carrier, and could similarly update its profile record.

Alternatively, to facilitate transitioning the WCD from being served by the base station on the in-band carrier to instead being served by another base station altogether, the base station could process handover of the WCD to the other (target) base station. For instance, the base station could transmit to the target base station a handover request message to prepare the target base station to serve the WCD, and the base station could then direct the WCD to transition to be served instead by the other base station. Other transition or offloading processes could be used as well.

The decision of whether to offload a WCD from the in-band carrier to another carrier could be based primarily on whether the base station is operating in a capacity-mode on the host carrier. Further, the base station could take into account other factors as well. By way of example, the base station could take into account a priority level of the WCD at issue. For instance, if the base station is serving many WCDs on the in-band carrier when the base station is operates in a capacity-mode on the host carrier, the base station could select one or more higher priority WCDs to offload so as to help improve each selected WCD's communication, while leaving one or more lower priority WCDs served on the in-band carrier. Or if the base station carries out this process for a WCD at the time a WCD connects with the base station on the in-band carrier, the base station could decide at that time whether the WCD's priority level is threshold high and, if so, could then responsively offload that WCD to another carrier. For these processes, the base station could determine a WCD's priority level in various ways, such as by referring to the WCD's context record for instance.

Figure 3:
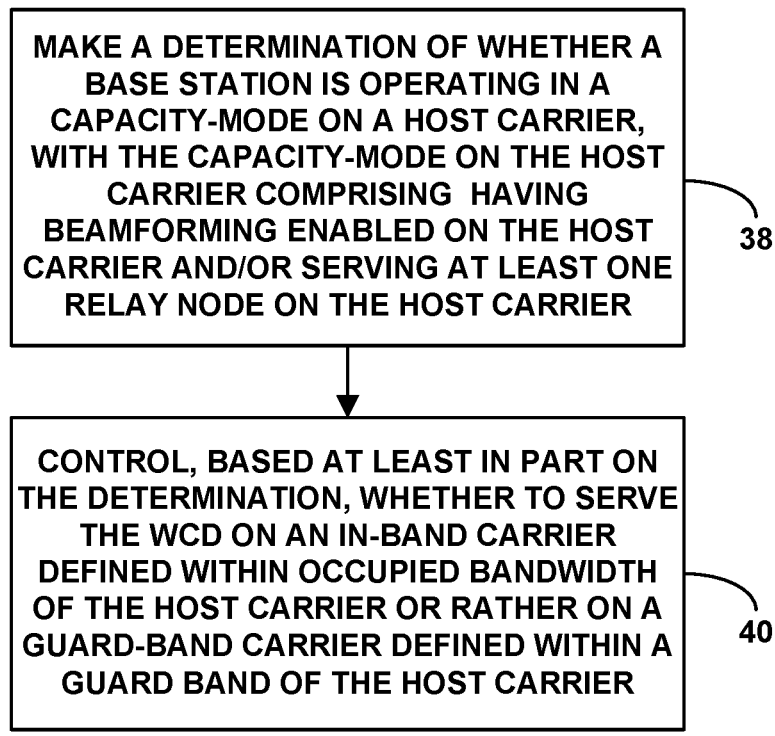
FIG. 3 is a flow chart depicting example operations in accordance with the disclosure.

FIG. 3 is a flow chart depicting a method that could be carried out in accordance with this disclosure, to control which carrier a base station will serve a WCD (e.g., an MTC device) on. This method could apply in a wireless communication system in which a base station provides service (i) on a host carrier, (ii) on an in-band carrier defined within occupied bandwidth of the host carrier, and (iii) on a guard-band carrier defined within a guard band of the host carrier.

As shown in FIG. 3, at block 38, the method includes the base station making a determination of whether the base station is operating in a capacity-mode on the host carrier, with the capacity-mode on the host carrier comprising (i) having beamforming enabled on the host carrier and/or (ii) serving at least one relay node on the host carrier. And at block 40, the method includes the base station controlling, based at least in part on the determination, whether to serve the WCD on the in-band carrier or rather on the guard-band carrier. In particular, as noted above, (a) if the determination is that the base station is not operating in the capacity-mode on the host carrier, then the base station could serve the WCD on the in-band carrier rather than on the guard-band carrier, whereas (b) if the determination is that the base station is operating in the capacity-mode on the host carrier, then the base station could serve the WCD on the guard-band carrier rather than the in-band carrier.

In line with the discussion above, the base station in this method could initially serve the WCD on the in-band carrier (e.g., with the WCD connecting or having connected with the base station on the in-band carrier). And in that case, the act of controlling whether to serve the WCD on the in-band carrier or rather on the guard-band carrier could involve controlling whether to continue serving the WCD on the in-band carrier or rather to transition from serving the WCD on the in-band carrier to serving the WCD on the guard-band carrier. Further, if the determination is that the base station is operating in the capacity-mode on the host carrier, then the method could additionally include the base station engaging in signaling with the WCD to reconfigure the WCD to operate on the guard-band carrier.

As also discussed above, the in-band carrier and host carrier could have common air interface resources allocable by the base station (e.g., common resource elements and perhaps PRBs), in which case the base station could be configured to give higher priority to allocation of the common air interface resources for service on the host carrier than to allocation of the common air interface resources for service on the in-band carrier.

Further, as discussed above, the act of the base station controlling whether to serve the WCD on the in-band carrier or rather on the guard-band carrier could additionally be based on a priority level of the WCD. For instance, the base station could decide to transition the WCD from the in-band carrier to the guard-band carrier in response to the base station operating in a capacity-mode on the host carrier and the WCD having a threshold or relatively high priority level.

Figure 4:
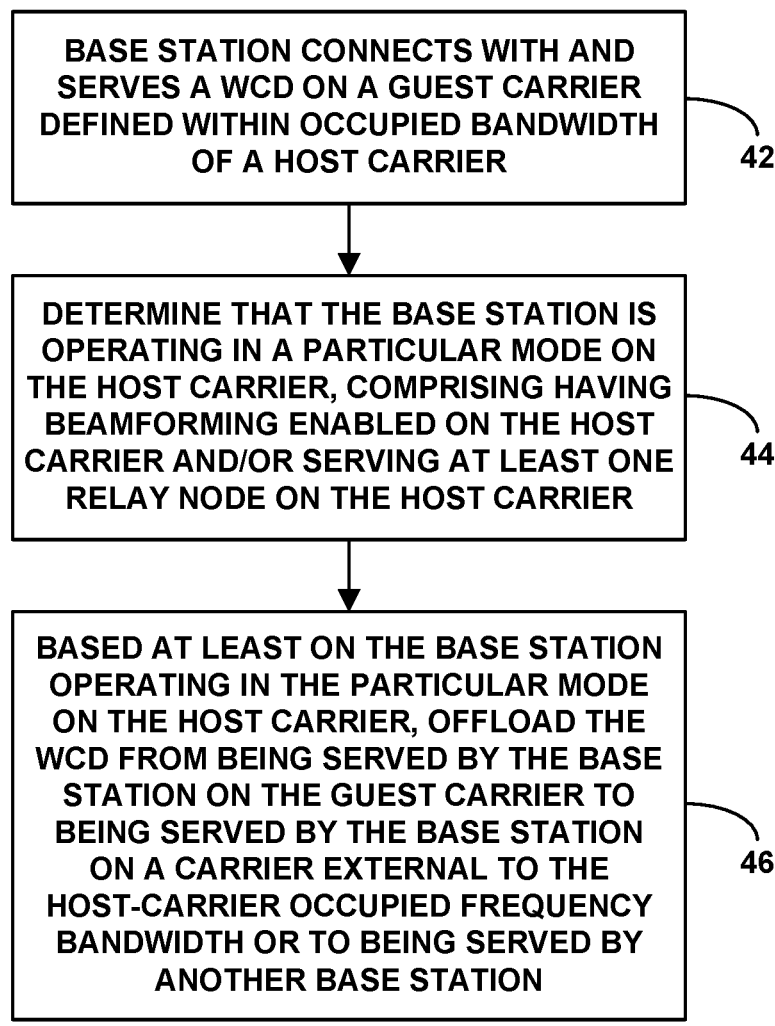
FIG. 4 is another flow chart depicting example operations in accordance with the disclosure.

FIG. 4 is next another flow chart depicting a method that could be carried out in accordance with the present disclosure. This method could apply in a wireless communication system in which a base station provides service on a host carrier having a host-carrier occupied frequency bandwidth and provides service on a guest carrier having a guest-carrier frequency bandwidth defined within and narrower than the host-carrier occupied frequency bandwidth.

As shown in FIG. 4, at block 42, the method includes the base station connecting with and serving a WCD (e.g., MTC device) on the guest carrier. For instance, the WCD could initially acquire connectivity with the base station on the guest carrier or could hand over to the base station on the guest carrier, with the base station and WCD engaging in random access signaling and Radio Resource Control (RRC) signaling on the guest carrier to establish an RRC connection on the guest carrier, such that the WCD then operates in an RRC connected mode to be served by the base station on the guest carrier.

At block 44, the method then includes determining that the base station is operating in a particular mode on the host carrier, where the particular mode on the host carrier comprises having beamforming enabled on the host carrier and/or serving at least one relay node on the host carrier. And at block 46, the method includes, based at least on the base station operating in the particular mode on the host carrier, offloading the WCD from being served by the base station on the guest carrier (i) to being served by the base station on a carrier external to the host-carrier occupied frequency bandwidth or (ii) to being served by another base station.

Various features described above could be applied in the context of this method as well, and vice versa. For instance, the guest-carrier frequency bandwidth and host-carrier occupied frequency bandwidth could have common air interface resources allocable by the base station, and the base station could be configured to prioritize use for the host carrier over use for the guest carrier. Further, the method could additionally involve determining a priority level of the WCD, with the offloading then being additionally based on the determined priority level of the WCD. And offloading the WCD from being served by the base station on the guest carrier to being served by the base station on a carrier external to the host carrier occupied frequency bandwidth could involve offloading the WCD to be served by the base station on a guard-band carrier, and could involve handing over the WCD and/or reconfiguring the WCD.

Figure 5:
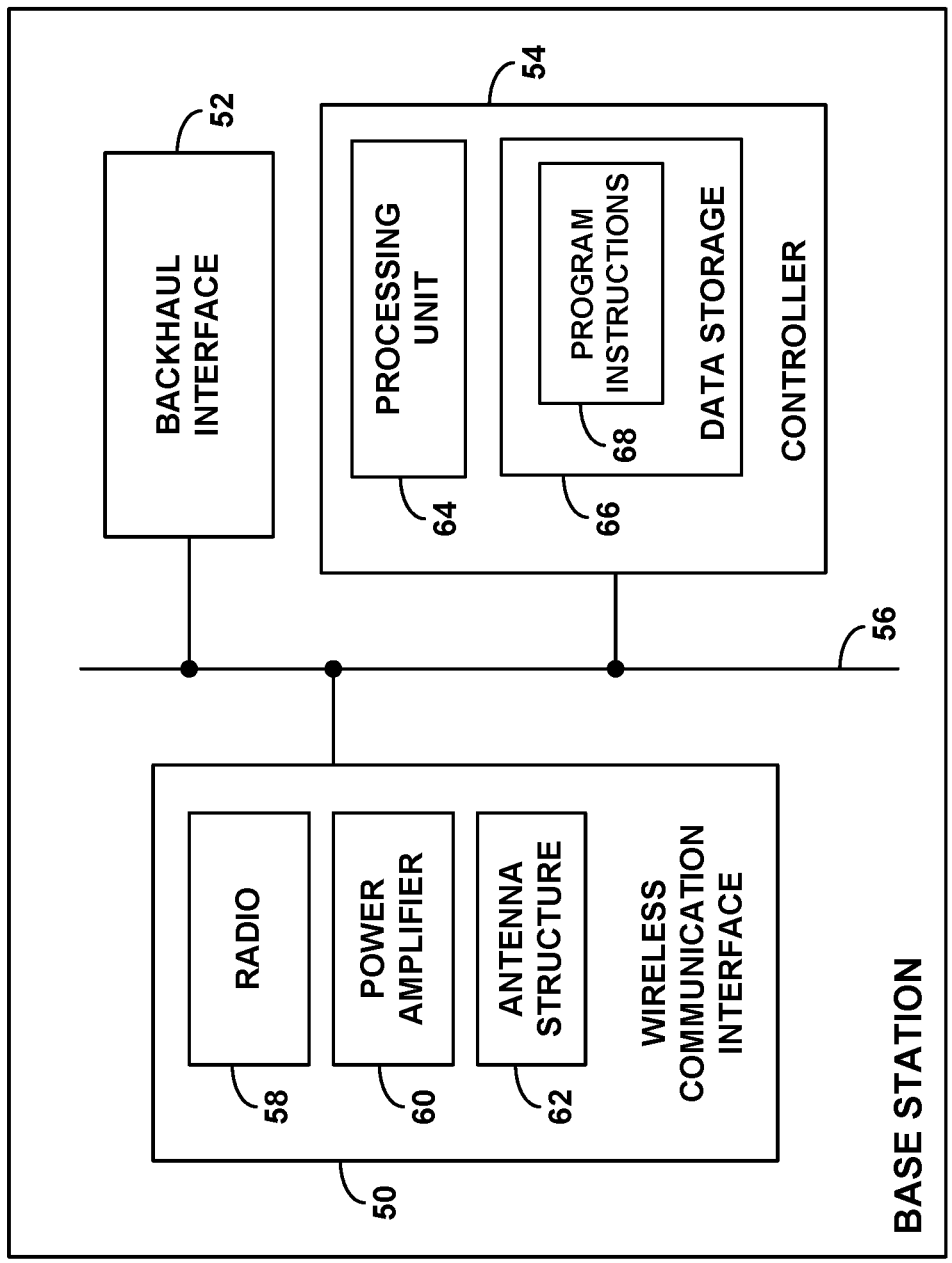
FIG. 5 is a simplified block diagram of a base station that could operate in accordance with the disclosure.

Finally, FIG. 5 is a simplified block diagram of an example base station that could be configured to implement features like those discussed above. Generally speaking, this base station could take any of a variety of forms, such as a macro base station, a small cell (e.g., femtocell) base station, a relay base station, or the like.

As shown in FIG. 5, the base station includes a wireless communication interface 50, a backhaul interface 52, and a controller 54, all of which could be integrated together in various ways or interconnected by a system bus, network, or other connection mechanism 56.

The wireless communication interface 50 could include at least one radio 58, at least one power amplifier 60, and at least one antenna structure 62, cooperatively enabling the base station to provide service (i) on a host carrier, (ii) on an in-band carrier defined within occupied bandwidth of the host carrier, and (iii) on a guard-band carrier defined within a guard band of the host carrier. Further, the backhaul interface 52 could comprise a network port through which the base station could be interconnected with other network entities, such as the MME and SGW as noted above.

And the controller 54 could comprise a processing unit 64 (e.g., one or more microprocessors), non-transitory data storage 66 (e.g., one or more volatile and/or non-volatile storage components), and program instructions 68 (e.g., machine language instructions) stored in the data storage 76 and executable by the processing unit 64 to carry out various base station operations described herein. For instance, the controller could be configured to control whether the base station serves a WCD (e.g., MTC device) on the in-band carrier or rather on the guard-band carrier, including (a) making a determination of whether the base station is operating in a capacity-mode on the host carrier, (b) if the determination is that the base station is not operating in the capacity-mode on the host carrier, then causing the base station to serve the WCD on the in-band carrier rather than the guard-band carrier, and (c) if the determination is that the base station is operating in the capacity-mode on the host carrier, then causing the base station to serve the WCD on the guard-band carrier rather than the in-band carrier.

Various operational features discussed above could then be incorporated in this base station, and vice versa. For instance, the base station could initially serve the WCD on the in-band carrier, in which case controlling whether the base station serves the WCD on the in-band carrier or rather on the guard-band carrier could involve controlling whether the base station continues serving the WCD on the in-band carrier or rather transitions from serving the WCD on the in-band carrier to serving the WCD on the guard-band carrier. Further, the act of controlling of whether the base station serves the WCD on the in-band carrier or rather on the guard-band carrier could be based additionally on a priority level of the WCD.

Exemplary embodiments have been described above. Those skilled in the art will understand, however, that changes and modifications may be made to these embodiments without departing from the true scope and spirit of the invention. Further, various features described above with respect to certain embodiments could be implemented in other embodiments described above as well.

We claim:

1. In a wireless communication system in which a base station provides service (i) on a host carrier, (ii) on an in-band carrier defined within occupied bandwidth of the host carrier, and (iii) on a guard-band carrier defined within a guard band of the host carrier, a method of controlling which carrier the base station serves a wireless client device (WCD) on, the method comprising:
    making a determination by the base station of whether the base station is operating in a capacity-mode on the host carrier, wherein the capacity-mode on the host carrier is selected from the group consisting of (i) having beamforming enabled on the host carrier and (ii) serving at least one relay node on the host carrier; and
    controlling by the base station, based at least in part on the determination, whether to serve the WCD on the in-band carrier or rather on the guard-band carrier, including (a) if the determination is that the base station is not operating in the capacity-mode on the host carrier, then serving the WCD on the in-band carrier rather than the guard-band carrier and (b) if the determination is that the base station is operating in the capacity-mode on the host carrier, then serving the WCD on the guard-band carrier rather than the in-band carrier.

2. The method of claim 1, further comprising the base station initially serving the WCD on the in-band carrier, wherein controlling whether to serve the WCD on the in-band carrier or rather on the guard-band carrier comprises controlling whether to continue serving the WCD on the in-band carrier or rather to transition from serving the WCD on the in-band carrier to serving the WCD on the guard-band carrier.

3. The method of claim 2, wherein, if the determination is that the base station is operating in the capacity-mode on the host carrier, then engaging in signaling by the base station with the WCD to reconfigure the WCD to operate on the guard-band carrier.

4. The method of claim 1, wherein the in-band carrier and host carrier have common air interface resources allocable by the base station, and wherein the base station is configured to give higher priority to allocation of the common air interface resources for service on the host carrier than to allocation of the common air interface resources for service on the in-band carrier.

5. The method of claim 1, wherein the controlling by the base station of whether to serve the WCD on the in-band carrier or rather on the guard-band carrier is additionally based on a priority level of the WCD.

6. The method of claim 1, wherein the WCD is a Machine Type Communication (MTC) device.

7. A base station comprising:
    a wireless communication interface including at least one radio, at least one power amplifier, and at least one antenna structure, cooperatively configured to provide service (i) on a host carrier, (ii) on an in-band carrier defined within occupied bandwidth of the host carrier, and (iii) on a guard-band carrier defined within a guard band of the host carrier; and
    a controller configured to control whether the base station serves a wireless client device (WCD) on the in-band carrier or rather on the guard-band carrier, including (a) making a determination of whether the base station is operating in a capacity-mode on the host carrier, wherein the capacity-mode on the host carrier is selected from the group consisting of having beamforming enabled on the host carrier and serving at least one relay node on the host carrier, (b) if the determination is that the base station is not operating in the capacity-mode on the host carrier, then causing the base station to serve the WCD on the in-band carrier rather than the guard-band carrier, and (c) if the determination is that the base station is operating in the capacity-mode on the host carrier, then causing the base station to serve the WCD on the guard-band carrier rather than the in-band carrier.

8. The base station of claim 7, wherein the controller comprises a processing unit, non-transitory data storage, and program instructions stored in the data storage and executable by the processing unit to control whether the base station serves a wireless client device (WCD) on the in-band carrier or rather on the guard-band carrier.

9. The base station of claim 7, wherein the base station initially serves the WCD on the in-band carrier, wherein controlling whether the base station serves the WCD on the in-band carrier or rather on the guard-band carrier comprises controlling whether the base station continues serving the WCD on the in-band carrier or rather transitions from serving the WCD on the in-band carrier to serving the WCD on the guard-band carrier.

10. The base station of claim 7, wherein the controlling of whether the base station serves the WCD on the in-band carrier or rather on the guard-band carrier is additionally based on a priority level of the WCD.

11. The base station of claim 7, wherein the WCD is a Machine Type Communication (MTC) device.

12. A method in a wireless communication system in which a base station provides service on a host carrier having a host-carrier occupied frequency bandwidth and provides service on a guest carrier having a guest-carrier frequency bandwidth defined within and narrower than the host-carrier occupied frequency bandwidth, the method comprising:
- connecting with and serving by the base station a wireless client device (WCD) on the guest carrier;
- determining that the base station is operating in a particular mode on the host carrier, wherein the particular mode on the host carrier comprises at least one mode selected from the group consisting of having beamforming enabled on the host carrier and serving at least one relay node on the host carrier; and
- based at least on the base station operating in the particular mode on the host carrier, offloading the WCD from being served by the base station on the guest carrier (i) to being served by the base station on a carrier external to the host-carrier occupied frequency bandwidth or (ii) to being served by another base station.

13. The method of claim 12, wherein the guest-carrier frequency bandwidth and host-carrier occupied frequency bandwidth have common air interface resources allocable by the base station, and wherein the base station is configured to give higher priority to allocation of the common air interface resources for the service on the host carrier than to allocation of the common air interface resources for the service on the guest carrier.

14. The method of claim 12, wherein connecting with and serving the WCD on the guest carrier comprises engaging in random access signaling and Radio Resource Control (RRC) signaling with the WCD on the guest carrier to establish an RRC connection with the WCD on the guest carrier.

15. The method of claim 12, further comprising determining a priority level of the WCD, wherein the offloading of the WCD is additionally based on the determined priority level of the WCD.

16. The method of claim 12, wherein having beamforming enabled on the host carrier comprises the base station being configured to apply beamforming on the host carrier.

17. The method of claim 12, wherein serving the at least one relay node on the host carrier comprises operating as a donor base station to serve the at least one relay node on the host carrier.

18. The method of claim 12, wherein offloading the WCD from being served by the base station on the guest carrier to being served by the base station on a carrier external to the host carrier occupied frequency bandwidth comprises offloading the WCD to be served by the base station on a guard-band carrier.

19. The method of claim 12, wherein offloading the WCD comprises an operation selected from the group consisting of (i) handing over the WCD and (ii) reconfiguring the WCD.

20. The method of claim 12, wherein the WCD is a Machine Type Communication (MTC) device.

* * * * *